United States Patent [19]  [11] 4,376,106
Miyanohara et al.  [45] Mar. 8, 1983

[54] PROCESS FOR PRODUCING Y-TYPE ZEOLITE

[75] Inventors: Isao Miyanohara, Kudamatsu; Shinichi Hashimoto; Hiroshi Miyazaki, both of Nanyo, all of Japan

[73] Assignee: Toyo Soda Manufacturing Co., Ltd., Nanyo, Japan

[21] Appl. No.: 301,749

[22] Filed: Sep. 14, 1981

Related U.S. Application Data

[63] Continuation of Ser. No. 117,837, Jan. 20, 1980, abandoned.

[30] Foreign Application Priority Data

Feb. 7, 1979 [JP] Japan .................................. 54-12215
Mar. 2, 1979 [JP] Japan .................................. 54-23394

[51] Int. Cl.³ .............................................. C01B 33/28
[52] U.S. Cl. ..................................... 423/429; 423/328
[58] Field of Search .............................. 423/328, 329; 252/455 Y

[56] References Cited

U.S. PATENT DOCUMENTS

| | | | |
|---|---|---|---|
| 3,433,589 | 3/1969 | Ciric | 423/329 |
| 3,481,699 | 12/1969 | Domine et al. | 423/329 |
| 3,492,090 | 1/1970 | Jenkins | 423/329 |
| 3,510,258 | 5/1970 | Hindin | 423/329 |
| 3,574,538 | 4/1971 | McDaniel et al. | 423/329 |
| 3,767,771 | 10/1973 | Guth et al. | 423/329 |
| 4,160,011 | 7/1979 | Estes et al. | 423/329 |

*Primary Examiner*—Edward J. Meros
*Attorney, Agent, or Firm*—Cushman, Darby & Cushman

[57] ABSTRACT

A Y-type zeolite having a $SiO_2/Al_2O_3$ ratio of at least about 4 is produced by the following process. In the first step of the process, an aqueous alkali silicate solution and an aqueous alkali aluminate solution are mixed together in the presence of an alkali in an amount such that the ratio of $M_2O$(M: an alkali metal)/$Al_2O_3$, present in the mixed solution, is at least about 5 by mole, followed by forming a gel in the mixed solution and, then, separating the gel therefrom. In the second step, the separated gel is incorporated in an aqueous alkali silicate solution or an aqueous alkali silicate-alkali mixed solution to obtain a slurry and, then, a Y-type zeolite crystal is formed in the slurry.

5 Claims, 1 Drawing Figure

PROCESS FOR PRODUCING Y-TYPE ZEOLITE

This is a continuation of application Ser. No. 117,837 filed Jan. 20, 1980, now abandoned.

BACKGROUND OF THE INVENTION (1) Field of the Invention

This invention relates to a process for producing a Y-type zeolite which possesses a faujasite-type crystal structure and a high $SiO_2/Al_2O_3$ ratio.

(2) Description of the Prior Art

A Y-type zeolite possessing a faujasite-type crystal structure is generally represented by the formula:

$$0.9 \pm 0.2 M_2O \cdot Al_2O_3 \cdot wSiO_2 \cdot zH_2O$$

wherein M is an alkali metal, w is a number in the range of from 3 to 7 and z is a number in the range of from 0 to 9. Such a Y-type zeolite is generally produced by a process wherein an alumina ($Al_2O_3$) source, such as sodium aluminate, active alumina or gamma alumina, and a silica ($SiO_2$) source, such as silicic acid, sodium silicate, silica gel or white carbon, are reacted with each other in an aqueous reaction medium in the presence of an alkali, and then, the crystalline particles of zeolite, so formed, are separated from the reaction medium.

Y-type zeolites are popularly used as catalysts for, for example, cracking of petroleum, alkylation of hydrocarbons and isomerization of n-paraffins and as adsorbents for, for example, separation of p-xylene. It is very desirable for Y-type zeolite catalysts and adsorbents to possess good thermal resistance and acid resistance. In general, the thermal resistance and the acid resistance of Y-type zeolites are closely related to the $SiO_2/Al_2O_3$ ratio thereof. The higher the $SiO_2/Al_2O_3$ ratio, the better the thermal resistance and the acid resistance. Y-type zeolites having a $SiO_2/Al_2O_3$ ratio of below about 4 do not exhibit thermal and acid resistances to a practically permissible extent. Thus, Y-type zeolites having a $SiO_2/Al_2O_3$ ratio of at least about 4 are useful. Although it is desirable for Y-type zeolites to have a $SiO_2/Al_2O_3$ ratio of about 5 or more, it is difficult to produce such Y-type zeolites with good reproducibility.

Japanese Patent Publication No. 1,639/1961 teaches that, although conventional synthetic Y-type zeolites prepared by using sodium silicate as a silica source have a $SiO_2/Al_2O_3$ ratio of below 3.9, synthetic Y-type zeolites prepared by using a solid silica, such as silica sol or white carbon, have a $SiO_2/Al_2O_3$ ratio of at least about 4. However, a solid silica such as silica sol or white carbon is expensive.

SUMMARY OF THE INVENTION

It is, therefore, a main object of the present invention to provide a process for producing Y-type zeolites, by which process Y-type zeolites having a $SiO_2/Al_2O_3$ ratio of at least about 4 can be prepared from a sodium silicate silica source with good reproducibility.

Other objects and advantages of the present invention will be apparent from the following description.

The process of the present invention comprises two main steps. In the first main step, an aqueous alkali silicate solution and an aqueous alkali aluminate solution are incorporated together in the presence of an alkali. The amount of alkali present in the resulting incorporated solution should be larger than that present in the alkali silicate/alkali aluminate incorporated solution prepared in a conventional zeolite synthesis, that is, should be such that the ratio of $M_2O$ (M: an alkali metal) to $Al_2O_3$ present in the resulting incorporated solution should be at least about 5 by mole. Then, a gel is formed in the incorporated solution containing such a large amount of the alkali, preferably either by maintaining the solution at a temperature of from 25° to 80° C. for a predetermined period, or, by leaving the solution to stand for a predetermined period under conditions, under which a gel is not formed, and then, incorporating water into the solution.

In the second main step, the gel separated from the mother liquor is incorporated in an aqueous solution of an alkali silicate or a mixture of an alkali silicate and an alkali to form a uniform slurry. Y-type crystals are formed in the slurry preferably by maintaining the slurry at a temperature of from 80° to 110° C.

BRIEF DESCRIPTION OF THE DRAWING

The accompanying drawing illustrates an X-ray diffraction pattern of the Y-type zeolite crystal prepared by the process of the present invention.

DESCRIPTION OF THE PREFERRED EMBODIMENTS

Figure 1:
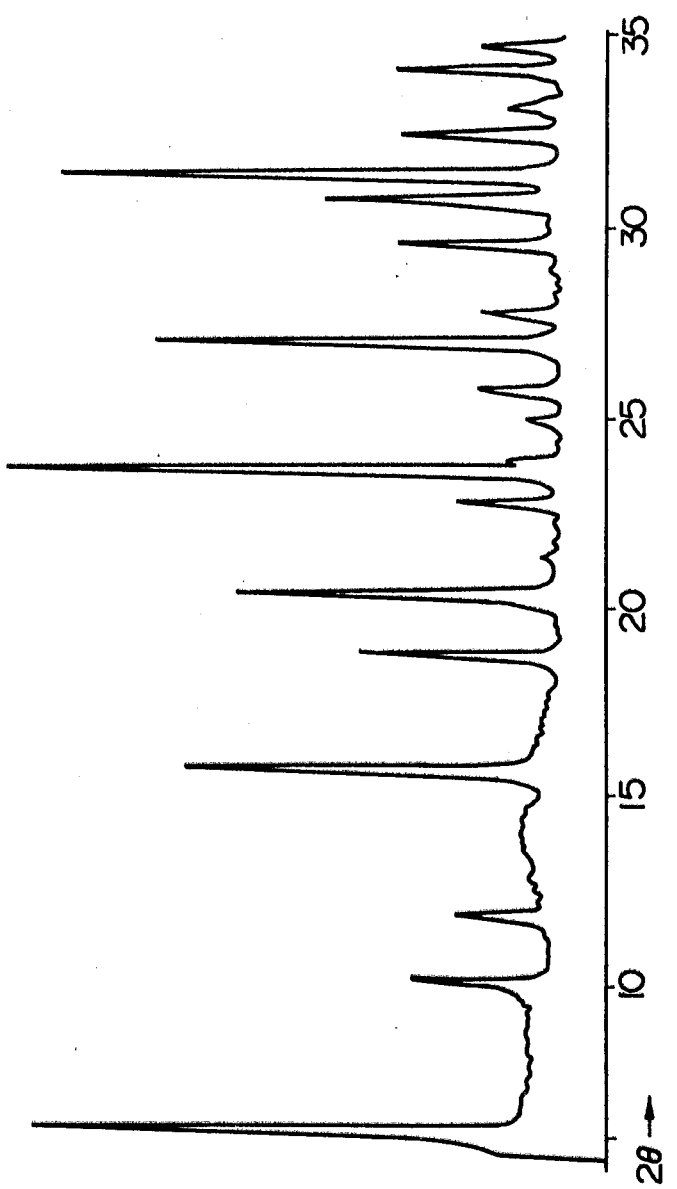

The alkalis used together with an aqueous alkali silicate solution and an aqueous alkali aluminate solution are those of univalent alkali metals, such as lithium, potassium and sodium. Of these sodium hydroxide is preferable. The alkali metal ingredients of the alkali silicate and the alkali aluminate are selected from the univalent alkali metals listed above. A preferable alkali metal ingredient is sodium.

The amount of the alkali used should be such that the molar ratio of $M_2O/Al_2O_3$ present in the incorporated solution is at least about 5, preferably at least about 7. The upper limit of the $M_2O/Al_2O_3$ molar ratio is not critical, but it is preferable that the $M_2O/Al_2O_3$ molar ratio be less than about 30. It is preferable that the alkali used be incorporated in one or both of the aqueous alkali silicate solution and the aqueous alkali aluminate solution prior to the incorporation of the two aqueous solutions. The concentration of $SiO_2$ in the aqueous alkali silicate solution and the concentration of $Al_2O_3$ in the aqueous alkali aluminate solution are not particularly limited, but these concentrations are preferably both at least about 2% by weight and less than about 30% by weight. If the aqueous alkali silicate solution and the aqueous alkali aluminate solution are prepared by dissolving cullet and aluminum hydroxide, respectively, in an aqueous alkali solution, the aqueous alkali solution may conveniently be used in such an amount that the resulting incorporated solution of the aqueous alkali silicate solution and the aqueous alkali aluminate solution has a $M_2O/Al_2O_3$ ratio of at least 5 by mole.

The incorporated solution of the aqueous alkali silicate solution and the aqueous alkali aluminate solution should preferably have a $SiO_2/Al_2O_3$ molar ratio of from 2 to 10, more preferably from 3 to 7. The incorporated solution having a $SiO_2/Al_2O_3$ molar ratio exceeding 10 is not preferable in view of its cost.

The use of a large amount of sodium hydroxide not only retards the gel formation, as hereinafter mentioned, but also, influences the characteristics of the gel. Thus, the use of a large amount of an alkali is crucial for the formation of a gel capable of being formed into Y-type zeolite crystals having the desired high $SiO_2$-

/Al$_2$O$_3$ molar ratio. The gel formation can be retarded even without the use of a large amount of an alkali, for example, by a method of cooling the incorporated solution. However, a gel capable of being formed into the intended Y-type zeolite crystals cannot be obtained by this method.

The gel formation may conveniently be carried out by maintaining the incorporated solution at a temperature of from 25° to 80° C. for a period of at least 10 minutes, preferably at a temperature of from 40° to 70° C. for a period of at least 20 minutes and more preferably at a temperature of from 50° to 70° C. for a period of 30 minutes. The maximum permissible limit of the period, for which the solution is maintained, is not critical, but the maintaining period is preferably less than about 10 hours. The gel, so formed, can be converted into Y-type zeolite crystals having the desired high SiO$_2$/Al$_2$O$_3$ ratio and having little or no impurity, with good reproducibility. When the maintaining temperature is too high, a salient amount of impurities tend to be produced and the crystallization degree of the resulting zeolite crystal is reduced to a considerable extent. In contrast, when the maintaining temperature is too low, the formation of the desired gel cannot be completed within a practically acceptable period of time. When the maintaining time is too short, the reproducibility of Y-type zeolite crystalls becomes reduced, i.e., the crystallization degree of the zeolite and the content of impurities in the zeolite are not constant, and occasionally no crystallization occurs.

The maintaining of the incorporated solution may be effected in two stages at different temperatures. In the first stage, the solution is maintained at a temperature of not higher than 60° C. for at least one minute, preferably at a temperature of not higher than 50° C. for at least 10 minutes and more preferably at a temperature of not higher than 40° C. for at least 15 minutes. In the second stage, the solution is heated or hot water is incorporated in the solution, and the solution is maintained at a higher temperature than the temperature employed in the first stage. That is, the solution is maintained at a temperature of not higher than 80° C. for at least 10 minutes, preferably at a temperature of from 30° to 70° C. for at least 15 minutes and more preferably at a temperature of from 35° to 70° C. for at least 20 minutes. The two stage maintaining is advantageous in that, first, the permissible temperature range in the second stage for producing an optimum gel can be broadened, and secondly, the time required for crystallization in the second main step, hereinafter mentioned, can be shortened.

The gel formation may also be effected by incorporating water in the incorporated solution. In the case where the gel is formed by incorporating water into the solution, it is preferable that, prior to the incorporation of water, the solution be left to stand under conditions, under which no gel is formed therein, i.e., at a temperature of not higher than 70° C., more preferably not higher than 50° C., for a period of at least 30 seconds, more preferably at least two minutes. The amount of water used is usually at least 1/10, preferably at least 1/5, of the weight of the solution into which water is to be incorporated. Hot water is more preferable than cold water.

The formed gel is separated from the aqueous reaction medium, for example, by filtration or centrifugation. The separated gel may preferably be washed with water for removing alkali and other foreign matters therefrom.

The mother liquor, i.e., the aqueous solution from which the gel has been separated, usually contains unreacted alkali silicate, alkali and a minor amount of alkali aluminate. These substances may be recovered therefrom for their reuse. In a preferable recovering procedure, a concentrated aqueous alkali silicate solution is added to the mother liquor, thereby adjusting the alkali silicate concentration, and then, the mixed solution is used as a silica source in the above-mentioned first main step. The concentrated aqueous alkali silicate solution may be prepared by concentrating the aqueous solution from which Y-type zeolite crystals have been separated as hereinafter mentioned. On advantage of the present invention is that both mother liquors obtained by the separation of the gel in the first main step and by the separation of the zeolite crystals in the second main step can be reused.

In the second main step, the separated gel is incorporated in an aqueous solution of an alkali silicate or a mixture of an alkali silicate and an alkali thereby to obtain a uniform slurry, in order to form the desired Y-type zeolite crystals having a high SiO$_2$/Al$_2$O$_3$ molar ratio. In other words, the gel obtained in the first main step serves as the alumina source and a part of the silica source for the formation of the desired Y-type zeolite, and the aqueous solution used in the second main step serves as the remaining part of the silica source.

The amount of the aqueous alkali silicate solution or the aqueous alkali silicate/alkali mixed solution should preferably be such that the resulting slurry has the following oxide ratios.

M$_2$O/SiO$_2$ molar ratio=from 0.25 to 0.50,
SiO$_2$/Al$_2$O$_3$ molar ratio=from 6 to 20, and
H$_2$O/M$_2$O molar ratio=from 20 to 80.

The formation of the zeolite crystal may be carried out by a conventional procedure, although suitable conditions vary depending upon the conditions under which the gel has been formed. Usually, the slurry may be maintained at a temperature of from 80° to 110° C. for a period of less than 150 hours. It is preferable that, prior to the crystal formation, the slurry be matured at a temperature of from 0° to 80° C. for a period of 100 hours. The maturing is usually conducted while the solution is stirred, but the crystallization should preferably be conducted while the slurry is not stirred or gently stirred, particularly at the time crystallization commences and thereafter.

The Y-type zeolite crystals may be separated from the mother liquor, washed with water and then, dried, in a conventional manner.

In conventional processes for preparing A-type or X-type zeolite from an aqueous alkali silicate solution and an aqueous alkali aluminate solution, the two solutions of predetermined concentrations are mixed together, whereby a gel is immediately formed. The M$_2$O/Al$_2$O$_3$ molar ratio in the mixed solution is in the range of from 2 to 3. The solution containing the formed gel is maintained at an elevated temperature, whereby the gel is crystallized. The process of the present invention is in a striking contrast to these conventional processes. Although the conventional processes result in zeolite having a SiO$_2$/Al$_2$O$_3$ molar ratio below 4, the process of the present invention results in a Y-type zeolite having a SiO$_2$/Al$_2$O$_3$ molar ratio of about 4 or more. The main point of the present invention resides in the use of the specified large amount of an alkali in the first main step and in the incorporation of the specified gel, obtained in the first main step, into an aqueous alkali silicate-containing solution in the second main step.

The invention will be further illustrated by the following examples, wherein percents are by weight unless otherwise specified.

In the examples, the crystallization degree of zeolite was determined as follows. A zeolite crystal specimen was analyzed by X-ray diffractometry (Cu-Kα). Diffraction intensities were measured on the ten crystal phases:

(111), (220), (311), (331), $\binom{333}{511}$, (440), (533), (642), $\binom{555}{751}$ and (664).

The total intensity was referred to as "$I_1$". Likewise, a commercially available Y-type zeolite crystal "SK-40" (trade name, supplied by Union Carbide Corp) was analyzed by X-diffractometry, and the obtained total intensity was referred to as "$I_2$". The crystallization degree of the above-mentioned zeolite crystal specimen was expressed in terms of a relative degree of crystallization, represented by the formula:

$$(I_1/I_2) \times 100(\%)$$

The $SiO_2/Al_2O_3$ ratio by mole of zeolite was determined from the lattice constant measured by X-ray diffractometry.

EXAMPLE 1

A two liter volume glass reactor was charged with 277 g of an aqueous commercially available sodium aluminate solution containing 18.4% of $Al_2O_3$ and 19.5% of $Na_2O$ and 1,780 g of an aqueous sodium hydroxide solution containing 37.2% of $Na_2O$. The mixture contained 2.48% of $Al_2O_3$ and 34.8% of $Na_2O$. The mixture was maintained at a temperature of 20° C. while being stirred.

A ten liter volume stainless steel reactor was charged with 629 g of an aqueous commercially available sodium silicate solution containing 28.6% of $SiO_2$ and 9.3% of $Na_2O$, and the content was maintained at a temperature of 20° C. Into this content, the above-mentioned content in the glass reactor was incorporated while being stirred. The mixture, so obtained, had a $Na_2O/Al_2O_3$ ratio of 25 by mole and was a clear solution having no gel formed therein. When ten minutes elapsed from the incorporation of the sodium aluminate/sodium hydroxide solution in the sodium silicate solution, 5 liters of deionized water were incorporated into the clear solution, thereby to form a gel. The gel was filtered off therefrom by using a glass filter (G-4), and then, washed with water to remove sodium hydroxide and other foreign matters from the gel. The gel cake, so obtained, was comprised of 3.5% of $Na_2O$, 5.8% of $Al_2O_3$, 10.3% of $SiO_2$ and 80.4% of $H_2$) and had a $SiO_2/Al_2O_3$ ratio of 3 by mole.

A one liter volume glass vessel was charged with 189 g of an aqueous sodium silicate solution containing 28.6% of $SiO_2$ and 9.3% of $Na_2O$, and 65 g of an aqueous sodium hydroxide solution containing 5.8% of $Na_2O$. A portion (175 g) of the above-mentioned gel cake was incorporated into the sodium silicate/sodium hydroxide mixed solution, and the resultant mixture was stirred to obtain a uniform slurry. The slurry had a $Na_2O/SiO_2$ ratio of 0.37, a $SiO_2/Al_2O_3$ ratio of 12 and a $H_2O/Na_2O$ ratio of 40, all by mole. Then, the slurry-charged glass vessel was closed and the slurry was maintained at a temperature of 25° C. for 16 hours.

Thereafter, the slurry-charged glass vessel was placed in an oil bath heated at a temperature of 95° C., and maintained at that temperature for 48 hours, thereby to complete crystallization. The zeolite crystal was filtered off under reduced pressure from the mother liquor, washed with water, and then, dried at a temperature of 110° C.

The zeolite crystal, so obtained, was proved to be a Y-type zeolite having a $SiO_2/Al_2O_3$ ratio of 5.2 by mole and a crystallization degree of 115% by X-ray diffractometry and by chemical analysis. The X-ray diffraction pattern is shown in FIG. 1.

EXAMPLE 2

By a procedure similar to that mentioned in Example 1, 277 g of an aqueous sodium aluminate solution containing 18.4% of $Al_2O_3$ and 19.5% of $Na_2O$ and 556 g of an aqueous sodium hydroxide solution containing 37.2% of $Na_2O$ were mixed together. The mixture contained 6.12% of $Al_2O_3$ and 31.3% of $Na_2O$. The mixture was maintained at a temperature of 20° C. while being stirred.

The above-mentioned mixture was incorporated in 524 g of an aqueous sodium silicate solution containing 28.6% of $SiO_2$ and 9.3% of $Na_2O$ and maintained at a temperature of 20° C. The obtained mixture had a $Na_2O/Al_2O_3$ ratio of 10 by mole. When three minutes had elapsed from the incorporation of the sodium aluminate-containing mixture in the sodium silicate solution, deionized water was incorporated in the mixture, thereby to form a gel. The gel was filtered off and, then, washed with water. The gel cake, so obtained, was comprised of 3.4% of $Na_2O$, 5.3% of $Al_2O_3$, 9.1% of $SiO_2$ and 82.2% of $H_2O$ and had a $SiO_2/Al_2O_3$ ratio of 2.9 by mole.

A portion (192 g) of the above-mentioned gel cake was incorporated in a mixture of 191 g of an aqueous sodium silicate solution containing 28.6% of $SiO_2$ and 9.3% of $Na_2O$, and 26 g of an aqueous sodium hydroxide solution containing 7.3% of $Na_2O$ to obtain a uniform slurry. The slurry had a $Na_2O/SiO_2$ ratio of 0.4, a $SiO_2/Al_2O_3$ ratio of 12 and a $H_2O/Na_2O$ ratio of 40, all by mole. A zeolite crystal was formed from the slurry in a manner similar to that mentioned in Example 1, wherein crystallization was completed by maintaining the slurry at a temperature of 95° C. in an oil bath for 30 hours.

The zeolite crystal was proved to be a Y-type zeolite having a $SiO_2/Al_2O_3$ ratio of 4.8 by mole and a cyrstallization degree of 112% by X-ray diffractometry and by chemical analysis.

EXAMPLE 3

333 g of an aqueous sodium aluminate solution containing 6.1% of $Al_2O_3$ and 6.5% of $Na_2O$, and 123 g of an aqueous sodium hydroxide solution containing 37.2% of $Na_2O$ were mixed together. The mixture contained 4.45% of $Al_2O_3$ and 14.8% of $Na_2O$. The mixture was maintained at a temperature of 5° C.

The above-mentioned mixture was incorporated in 210 g of an aqueous sodium silicate solution containing 28.6% of $SiO_2$ and 9.3% of $Na_2O$, and maintained at a temperature of 5° C. The obtained mixture had a $Na_2O/Al_2O_3$ ratio of 7 by mole. When three minutes had elapsed from the incorporation of the sodium aluminate-containing mixture in the sodium silicate solution, deionized water was incorporated in the mixture, thereby to form a gel. The gel was filtered off and then, washed with eater. The gel cake, so obtained, was comprised of 3.2% of $Na_2O$, 5.2% of $Al_2O_3$, 8.6% of $SiO_2$ and 83% of $H_2O$ and had a $SiO_2/Al_2O_3$ ratio of 2.8 by mole.

A portion (195 g) of the above-mentioned gel cake was incorporated in a mixture of 190 g of an aqueous sodium silicate solution containing 28.6% of $SiO_2$ and 9.3% of $Na_2O$, and 67 g of an aqueous sodium hydroxide solution containing 8.2% of $Na_2O$ to obtain a uniform slurry. The slurry had a $Na_2O/SiO_2$ ratio of 0.4, a $SiO_2/Al_2O_3$ ratio of 12 and a $H_2O/Na_2O$ ratio of 40, all by mole. A zeolite crystal was formed from the slurry in a manner similar to that mentioned in Example 1, wherein crystallization was completed by maintaining the slurry at a temperature of 95° C. in an oil bath for 30 hours.

The zeolite crystal was proved to be a Y-type zeolite having a $SiO_2/Al_2O_3$ ratio of 4.8 by mole and a crystallization degree of 103% by X-ray diffractometry and by chemical analysis.

EXAMPLE 4

555 g of an aqueous sodium aluminate solution containing 3.68% of $Al_2O_3$ and 3.90% of $Na_2O$, and 77 g of an aqueous sodium hydroxide solution containing 37.2% of $Na_2O$ were mixed together. The mixture contained 3.23% of $Al_2O_3$ and 7.96% of $Na_2O$. The mixture was maintained at a temperature of 5° C.

The above-mentioned mixture was incorporated in 126 g an aqueous sodium silicate solution containing 28.6% of $SiO_2$ and 9.3% of $Na_2O$, and maintained at a temperature of 5° C. The obtained mixture had a $Na_2O/Al_2O_3$ ratio of 5 by mole. When two minutes had elapsed from the incorporation of the sodium aluminate-containing mixture in the sodium silicate solution, deionized water was incorporated in the mixture, thereby to form a gel. The gel was filtered off and, then, washed with water. The gel cake, so obtained, was comprised of 3.4% of $Na_2O$, 5.5% of $Al_2O_3$, 9% of $SiO_2$ and 82.1% of $H_2O$, and had a $SiO_2/Al_2O_3$ ratio of 2.8 by mole.

A portion (189 g) of the above-mentioned gel cake was incorporated in a mixture of 152 g of an aqueous sodium silicate solution containing 28.6% of $SiO_2$ and 9.3% of $Na_2O$, and 70 g of an aqueous sodium hydroxide solution containing 9% of $Na_2O$ to obtain a uniform slurry. The slurry had a $Na_2O/SiO_2$ ratio of 0.43, a $SiO_2/Al_2O_3$ ratio of 10 and a $H_2O/Na_2O$ ratio of 40, all by mole. A zeolite crystal was formed from the slurry in a manner similar to that mentioned in Example 1, wherein crystallization was completed by maintaining the slurry at a temperature of 95° C. in an oil bath for 48 hours.

The zeolite crystal was proved to be a Y-type zeolite having a $SiO_2/Al_2O_3$ ratio of 4.2 by mole and a crystallization degree of 97% by X-ray diffractometry and by chemical analysis.

EXAMPLE 5

333 g of an aqueous sodium aluminate solution containing 6.1% of $Al_2O_3$ and 6.5% of $Na_2O$, and 123 g of an aqueous sodium hydroxide solution containing 37.2% of $Na_2O$ were mixed together. The mixture contained 4.45% of $Al_2O_3$ and 14.8% of $Na_2O$. The mixture was maintained at a temperature of 5° C.

The above-mentioned mixture was incorporated in 210 g of an aqueous sodium silicate solution containing 28.6% of $SiO_2$ and 9.3% of $Na_2O_3$, and maintained at a temperature of 5° C. A gel was formed from the obtained mixture in a manner similar to that mentioned in Example 3, wherein the gel formation was effected by allowing the mixture to stand without incorporation of deionized water therein. The gel was filtered off and, then, washed with water. The gel cake, so obtained, was comprised of 3.7% of $Na_2O$, 6.1% of $Al_2O_3$, 10.1% of $SiO_2$ and 80.1% of $H_2O$, and had a $SiO_2/Al_2O_3$ ratio of 2.8 by mole.

A portion (166 g) of the above-mentioned gel cake was incorporated in a mixture of 191 g of an aqueous sodium silicate solution containing 28.6% of $SiO_2$ and 9.3% of $Na_2O$, and 97 g of an aqueous sodium hydroxide solution containing 5.8% of $Na_2O$ to obtain a uniform slurry. The slurry had a $Na_2O/SiO_2$ ratio of 0.4, a $SiO_2/Al_2O_3$ ratio of 12 and a $H_2O/Na_2O$ ratio of 40, all by mole. A zeolite crystal was formed from the slurry in a manner similar to that mentioned in Example 1, wherein crystallization was completed by maintaining the slurry at a temperature of 95° C. in an oil bath for 30 hours.

The zeolite crystal was proved to be a Y-type zeolite having a $SiO_2/Al_2O_3$ ratio of 4.8 by mole and a crystallization degree of 76% by X-ray diffractometry and by chemical analysis.

COMPARATIVE EXAMPLE 1

A fine liter volume stainless steel reactor was charged with 420 g of an aqueous sodium silicate solution containing 28.6% of $SiO_2$ and 9.3% of $Na_2O$, and the content was maintained at a temperature of 20° C. 850 g of an aqueous sodium aluminate solution containing 6.00% of $Al_2O_3$ and 6.35% of $Na_2O$, and maintained at a temperature of 20° C., were incorporated into the content in the reactor. The resultant mixture had a $Na_2O/Al_2O_3$ ratio of 3.0 by mole. Upon the incorporation of the sodium aluminate solution, a gel immediately formed. The gel was filtered off, and then, washed with water to remove sodium hydroxide and other foreign matters therefrom. The gel cake, so obtained, was comprised of 3.5% of $Na_2O$, 5.9% of $Al_2O_3$, 10.1% of $SiO_2$ and 80.5% of $H_2O$, and had a $SiO_2/Al_2O_3$ ratio of 2.9 by mole.

A portion (172 g) of the above-mentioned gel cake incorporated in a mixture of 190 g of an aqueous sodium silicate solution containing 28.6% of $SiO_2$ and 9.3% of $Na_2O$, and 66 g of an aqueous sodium hydroxide solution containing 5.7% of $Na_2O$ to obtain a uniform slurry. The slurry had a $Na_2O/SiO_2$ ratio of 0.37, a $SiO_2/Al_2O_3$ ratio of 12 and a $H_2O/Na_2O$ ratio of 40, all by mole, which numerical values were the same as those of the slurry obtained in Example 1. A zeolite crystal was formed from the slurry in a manner similar to that mentioned in Example 1, wherein crystallization was completed by maintaining the slurry at a temperature of 95° C. in an oil bath for 72 hours.

The X-ray diffraction analysis of the zeolite crystal showed that it had no Y-type structure.

COMPARATIVE EXAMPLE 2

Following a procedure similar to that mentioned in Example 1, a gel was prepared by mixing together 126 g of an aqueous sodium silicate solution containing 28.6% of $SiO_2$ and 9.3% of $Na_2O$, and maintained at a temperature of 5° C., 555 g of an aqueous sodium aluminate solution containing 3.68% of $Al_2O_3$ and 3.90% of $Na_2O$, and maintained at a temperature of 5° C., and 43.7 g of an aqueous sodium hydroxide solution containing 37.2% of $Na_2O$. The mixture of these three aqueous solutions had a $Na_2O/Al_2O_3$ ratio of 4 by mole. Upon mixing these three aqueous solutions, the gel immediately started to form. The gel was filtered off and, then, washed with water. The gel cake, so obtained, was comprised of 3.9% of $Na_2O$, 6.5% of $Al_2O_3$, 10.6% of $SiO_2$ and 79% of $H_2O$, and had a $SiO_2/Al_2O_3$ ratio of 2.8 by mole.

A portion (158 g) of the above-mentioned gel cake was incorporated in a mixture of 153 g of an aqueous sodium silicate solution containing 28.6% of $SiO_2$ and 9.3% of $Na_2O$, and 99 g of an aqueous sodium hydroxide solution containing 6.6% of $Na_2O$ to obtain a uniform slurry. The slurry had a $Na_2O/SiO_2$ ratio of 0.43, a $SiO_2/Al_2O_3$ ratio of 10 and $H_2O/Na_2O$ ratio of 40, all by mole, which numerical values were the same as those of the slurry obtained in Example 4. A zeolite crystal was formed from the slurry in a manner similar to that mentioned in Example 1, wherein crystallization was completed by maintaining the slurry at a temperature of 95° C. in an oil bath for 48 hours.

The X-ray diffraction analysis of the zeolite crystal showed that it was a mixture of Y-type zeolite and phillipsite, and the Y-type zeolite had a crystallization degree of 32%.

COMPARATIVE EXAMPLE 3

277 g of an aqueous sodium aluminate solution containing 18.4% of $Al_2O_3$ and 19.5% of $Na_2O$ were diluted with 556 g of deionized water, and then, the diluted sodium aluminate solution was maintained at a temperature of 20° C. Following a procedure similar to that mentioned in Example 1, a gel was prepared by mixing together the diluted sodium aluminate solution and 524 g of an aqueous sodium silicate solution containing 28.6% of $SiO_2$ and 9.3% of $Na_2O$, and maintained at a temperature of 20° C. The mixture of the diluted sodium aluminate solution and the sodium silicate solution had a $Na_2O/Al_2O_3$ ratio of 3.3 by mole. Upon mixing the two solutions, the gel immediately started to form. The gel was filtered off and, then, washed with water. The gel cake, so obtained, was comprised of 3.5% of $Na_2O$, 5.8% of $Al_2O_3$, 10.3% of $SiO_2$ and 80.4% of $H_2O$, and had a $SiO_2/Al_2O_3$ ratio of 3 by mole.

A portion (170 g) of the above-mentioned gel cake incorporated in a mixture of 187 g of an aqueous sodium silicate solution containing 28.6% of $SiO_2$ and 9.3% of $Na_2O$, and 92 g of an aqueous sodium hydroxide solution containing 6.6% of $Na_2O$ to obtain a uniform slurry. The slurry had a $Na_2O/SiO_2$ ratio of 0.4, a $SiO_2/Al_2O_3$ ratio of 12 and $H_2O/Na_2O$ ratio of 40, all by mole, which numerical values were the same as those of the slurry obtained in Example 2. A zeolite crystal was formed from the slurry in a manner similar to that mentioned in Example 1, wherein crystallization was completed by maintaining the slurry at a temperature of 95° C. in an oil bath for 30 hours.

The X-ray diffraction analysis of the zeolite crystal showed that it contained no Y-type zeolite but phillipsite.

EXAMPLE 6

A 0.5 liter volume glass reactor was charged with an aqueous commercially available sodium aluminate solution and deionized water to prepare 200 g of an aqueous sodium aluminate solution containing 10.2% of $Al_2O_3$ and 10.8% of $Na_2O$. The prepared sodium aluminate solution was maintained at a temperature of 25° C.

A two liter volume glass reactor was charged with an aqueous commercially available sodium silicate solution, and then, with an aqueous sodium hydroxide solution, to prepare 1,000 g of an aqueous sodium silicate solution containing 6% of $SiO_2$ and 9.3% of $Na_2O$. The prepared sodium silicate solution was maintained at a temperature of 25° C. while being stirred. Into this sodium silicate solution, 200 g of the above-mentioned sodium aluminate solution were incorporated. The resultant mixture had a $SiO_2/Al_2O_3$ ratio of 5 and a $Na_2O/Al_2O_3$ ratio of 9, both by mole. The mixture was maintained at a temperature of 25° C. for 0.5 hour. Then, the mixture was heated to a temperature of 60° C. and, then, maintained at that temperature for one hour, thereby to form a gel. The gel was filtered off under reduced pressure, and then, washed with water to remove sodium hydroxide and other foreign matters therefrom. The gel cake, so obtained, was comprised of 3.3% of $Na_2O$, 5.6% of $Al_2O_3$, 9.9% of $SiO_2$ and 81.2% of $H_2O$.

A one liter volume glass vessel was charged with 208 g of an aqueous sodium silicate solution containing 28.6% of $SiO_2$ and 9.3% of $Na_2O$, and 52 g of an aqueous sodium hydroxide solution containing 5.1% of $Na_2O$. A portion (181 g) of the above-mentioned gel cake was incorporated into the sodium silicate/sodium hydroxide mixed solution, and the resultant mixture was stirred to obtain a uniform slurry. The slurry had a $Na_2O/SiO_2$ ratio of 0.35, a $SiO_2/Al_2O_3$ ratio of 13 and a $H_2O/Na_2O$ ratio of 40, all by mole. Then, the slurry-charged glass vessel was closed and the slurry was maintained at a temperature of 25° C. for 16 hours. Thereafter, the slurry-charged glass vessel was placed in an oil bath heated at a temperature of 95° C., and maintained at that temperature for 72 hours, thereby to complete crystallization.

The zeolite crystal, so obtained, was proved to be a Y-type zeolite having a $SiO_2/Al_2O_3$ ratio of 5.4 by mole and a crystallization degree of 108%.

EXAMPLE 7

200 g of an aqueous sodium aluminate solution containing 10.2% of $Al_2O_3$ and 10.8% of $Na_2O$ were prepared by diluting an aqueous commercially available sodium aluminate solution with deionized water. The prepared sodium aluminate solution was maintained at a temperature of 25° C. 1,000 g of an aqueous sodium silicate solution containing 6% of $SiO_2$ and 10.6% of $Na_2O$ were prepared by mixing an aqueous commercially available sodium silicate solution with an aqueous sodium hyroxide solution. The prepared sodium silicate solution was maintained at a temperature of 25° C. A gel was prepared from a mixture of the sodium aluminate solution and the sodium silicate solution in a manner similar to that mentioned in Example 6. The obtained gel was filtered off and, then, washed with water. The gel cake, so obtained, was comprised of 3.5% of $Na_2O$, 5.8% of $Al_2O_3$, 10% of $SiO_2$ and 80.7% of $H_2O$.

A 0.5 liter volume glass vessel was charged with 210 g of an aqueous sodium silicate solution containing 28.6% of $SiO_2$ and 9.3% of $Na_2O$, and 45 g of an aqueous sodium hydroxide solution containing 3.3% of $Na_2O$. A portion (176 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.34, a $SiO_2/Al_2O_3$ ratio of 13 and a $H_2O/Na_2O$ ratio of 40, all by mole. A zeolite crystal was formed from the slurry in a manner similar to that mentioned in Example 6, wherein crystallization was completed by maintaining the slurry at a temperature of 95° C. for 96 hours.

The zeolite crystal, so obtained, was proved to be a Y-type zeolite having a $SiO_2/Al_2O_3$ ratio of 5.6 by mole and a crystallization degree of 105%.

EXAMPLE 8

Following the procedure mentioned in Example 6, a gel cake was prepared, wherein the gel formation was effected by maintaining the mixture of the diluted sodium aluminate solution and the sodium silicate/sodium hydroxide mixed solution at a temperature of 25° C. for 0.5 hour, and then, further maintaining the mixture at a temperature of 35° C. for two hours. The gel cake, so parepared, was comprised of 3.3% of $Na_2O$, 5.6% of $Al_2O_3$, 9.6% of $SiO_2$ and 81.5% of $H_2O$.

A 0.5 liter volume glass vessel was charged with 169 g of an aqueous sodium silicate solution containing 28.6% of $SiO_2$ and 9.3% of $Na_2O$, and 16 g of an aqueous sodium hydroxide solution containing 8.8% of $Na_2O$. A portion (183 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.34, a $SiO_2/Al_2O_3$ ratio of 11 and a $H_2O/Na_2O$ ratio of 40, all by mole. A zeolite crystal was formed from the slurry in a manner similar to that mentioned in Example 6.

The zeolite crystal, so obtained, was proved to be a Y-type zeolite having a $SiO_2/Al_2O_3$ ratio of 5.3 by mole and a crystallization degree of 104%.

EXAMPLE 9

Following the procedure mentioned in Example 6, a gel cake was prepared, wherein the gel formation was effected by maintaining the mixture of the diluted sodium aluminate solution and the sodium silicate/sodium hydroxide mixed solution at a temperature of 25° C. for 0.5 hour, and then, further maintaining the mixture at a temperature of 80° C. for one hour. The gel cake, so prepared, was comprised of 3.5% of $Na_2O$, 5.7% of $Al_2O_3$, 9.5% of $SiO_2$ and 81.3% of $H_2O$.

A 0.5 liter volume glass vessel was charged with 172 g of an aqueous sodium silicate solution containing 28.6% of $SiO_2$ and 9.3% of $Na_2O$, and 44 g of an aqueous sodium hydroxide solution containing 6.9% of $Na_2O$. A portion (180 g) of the above-mentioned gel cake was incorporated into the sodium silicate/sodium hydroxide mixed solution, and the resultant mixture was stirred to obtain a uniform slurry. The slurry had a $Na_2O/SiO_2$ ratio of 0.37, a $SiO_2/Al_2O_3$ ratio of 11 and a $H_2O/Na_2O$ ratio of 40, all by mole. A zeolite crystal was formed from the slurry in a manner similar to that mentioned in Example 6, wherein crystallization was completed by maintaining the slurry at a temperature of 95° C. for 30 hours.

The zeolite crystal, so obtained, was proved to be a Y-type zeolite having a $SiO_2/Al_2O_3$ ratio or 4.7 by mole and a crystallization degree of 91%.

COMPARATIVE EXAMPLE 4

Following the procedure mentioned in Example 6, a gel cake was prepared, wherein the gel formation was effected by maintaining the mixture of the diluted sodium aluminate solution and the sodium silicate/sodium hydroxide mixed solution at a temperature of 25° C. for 0.5 hour, and then, further maintaining the mixture at a temperature of 90° C. for one hour. The gel cake, so prepared, was comprised of 3.4% of $Na_2O$, 5.7% of $Al_2O_3$, 9.5% of $SiO_2$ and 81.4% of $H_2O$.

A 0.5 liter volume glass vessel was charged with 172 g of an aqueous sodium silicate solution containing 28.6% of $SiO_2$ and 9.3% of $Na_2O$, and 44 g of an aqueous sodium hydroxide solution containing 6.9% of $Na_2O$. A portion (180 g) of the above-mentioned gel cake was incorporated into the sodium silicate/sodium hydroxide mixed solution, and the resultant mixture was stirred to obtain a uniform slurry. The slurry had a $Na_2O/SiO_2$ ratio of 0.37, a $SiO_2/Al_2O_3$ ratio of 11 and a $H_2O/Na_2O$ ratio of 40, all by mole, which numerical values were the same as those of the slurry obtained in Example 9. A zeolite crystal was formed from the slurry in a manner similar to that mentioned in Example 6.

The X-ray diffraction analysis of the resultant zeolite crystal showed that it was a mixture of Y-type zeolite and phillipsite and the Y-type zeolite had a crystallization degree of 47%.

EXAMPLE 10

Following the procedure mentioned in Example 6, a gel cake was prepared, wherein the gel formation was effected by maintaining the mixture of the diluted sodium aluminate solution and the sodium silicate/sodium hydroxide mixed solution at a temperature of 40° C. for one hour. The gel cake, so prepared, was comprised of 3.3% of $Na_2O$, 5.5% of $Al_2O_3$, 9.5% of $SiO_2$ and 81.7% of $H_2O$.

A 0.5 liter volume glass vessel was charged with 170 g of an aqueous sodium silicate solution containing 28.6% of $SiO_2$ and 9.3% of $Na_2O$, and 40 g of an aqueous sodium hydroxide solution containing 8.5% of $Na_2O$. A portion (187 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.37, a $SiO_2/Al_2O_3$ ratio of 11 and a $H_2O/Na_2O$ ratio of 40, all by mole. A zeolite crystal was formed from the slurry in a manner similar to that mentioned in Example 6, wherein crystallization was completed by maintaining the slurry at a temperature of 95° C. for 48 hours.

The zeolite crystal, so obtained, was proved to be a Y-type zeolite having a $SiO_2/Al_2O_3$ ratio of 4.9 by mole and a crystallization degree of 104%.

EXAMPLE 11

Following the procedure mentioned in Example 6, a gel cake was prepared, wherein the gel formation was effected by maintaining the mixture of the diluted sodium aluminate solution and the sodium silicate/sodium hydroxide mixed solution at a temperature of 25° C. for four hours. The gel cake, so prepared, was comprised of 3.7% of $Na_2O$, 5.9% of $Al_2O_3$, 9.4% of $SiO_2$ and 81.0% of $H_2O$.

A 0.5 liter volume glass vessel was charged with 133 g of an aqueous sodium silicate solution containing 28.6% of $SiO_2$ and 9.3% of $Na_2O$, and 6 g of an aqueous sodium hydroxide solution containing 15% of $Na_2O$. A portion (174 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.35, a $SiO_2/Al_2O_3$ ratio of 9 and a $H_2O/Na_2O$ ratio of 40, all by mole. A zeolite crystal was formed from the slurry in a manner similar to that mentioned in Example 6, wherein crystallization was completed by maintaining the slurry at a temperature of 95° C. for 72 hours.

The zeolite crystal, so obtained, was proved to be a Y-type zeolite having a $SiO_2/Al_2O_3$ ratio of 4.8 by mole and a crystallization degree of 103%.

COMPARATIVE EXAMPLE 5

Following the procedure mentioned in Example 6, a gel cake was prepared, wherein the gel formation was effected by maintaining the mixture of the diluted sodium aluminate solution and the sodium silicate/sodium hydroxide mixed solution at a temperature of 20° C. for five hours. The gel cake, so prepared, was comprised of 3.7% of $Na_2O$, 5.8% of $Al_2O_3$, 9.3% of $SiO_2$ and 81.2% of $H_2O$.

A 0.5 liter volume glass vessel was charged with 132 g of an aqueous sodium silicate solution containing 28.6% of $SiO_2$ and 9.3% of $Na_2O$, and 3 g of an aqueous sodium hydroxide solution containing 24% of $Na_2O$. A portion (177 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.35, a $SiO_2/Al_2O_3$ ratio of 9 and a $H_2O/Na_2O$ ratio of 40, all by mole which numerical values were the same as those of the slurry obtained in Example 11.

EXAMPLE 12

Following the procedure mentioned in Example 6, a gel cake was prepared, wherein the gel formation was effected by maintaining the mixture of the diluted sodium aluminate solution and the sodium silicate/sodium hydroxide mixed solution at a temperature of 60° C. for ten minutes. The gel cake, so obtained, was comprised of 3.4% of $Na_2O$, 5.4% of $Al_2O_3$, 9.4% of $SiO_2$ and 81.8% of $H_2O$.

A 0.5 liter volume glass vessel was charged with 169 g of an aqueous sodium silicate solution containing 28.6% of $SiO_2$ and 9.3% of $Na_2O$, and 37 g of an aqueous sodium hydroxide solution containing 8.5% of $Na_2O$. A portion (189 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.37, a $SiO_2/Al_2O_3$ ratio of 11 and a $H_2O/Na_2O$ ratio of 40, all by mole. A zeolite crystal was formed from the slurry in a manner similar to that mentioned in Example 6, wherein crystallization was completed by maintaining the slurry at a temperature of 95° C. for 48 hours.

The zeolite crystal, so obtained, was proved to be a Y-type zeolite having a $SiO_2/Al_2O_3$ ratio of 4.7 by mole and a crystallization defree of 95%.

COMPARATIVE EXAMPLE 6

Following the procedure mentioned in Example 6, a gel cake was prepared, wherein the step of maintaining the mixture of the diluted sodium aluminate solution and the sodium silicate/sodium hydroxide mixed solution at a temperature of 25° C. for 0.5 hour, and further, maintaining the mixture at a temperature of 60° C. for one hour was omitted. The gel cake, so prepared, was comprised of 3.5% of $Na_2O$, 5.7% of $Al_2O_3$, 10.1% of $SiO_2$ and 80.7% of $H_2O$.

A 0.5 liter volume glass vessel was charged with 168 g of an aqueous sodium silicate solution containing 28.6% of $SiO_2$ and 9.3% of $Na_2O$, and 48 g of an aqueous sodium hydroxide solution containing 7.1% of $Na_2O$. A portion (179 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.37, a $SiO_2/Al_2O_3$ ratio of 11 and a $H_2O/Na_2O$ ratio of 40, all by mole, which numerical values were the same as those of the slurry obtained in Example 12. A zeolite crystal was obtained from the slurry in a manner similar to that mentioned in Example 6. The obtained zeolite crystal is herein referred to as "product A".

The above-mentioned procedure for the preparation of a zeolite crystal was repeated twice to obtain two type products, which are herein referred to as "product B" and "product C".

The X-ray diffraction analysis of products A, B and C showed the following. Product A was a Y-type zeolite having a $SiO_2/Al_2O_3$ ratio of 4.7 by mole and a crystallization degree of 93%. Product B contained no Y-type zeolite. Product C contained only a minor amount of a Y-type zeolite.

EXAMPLE 13

840 g of an aqueous sodium aluminate solution containing 2.4% of $Al_2O_3$ and 6% of $Na_2O$ were prepared by mixing an aqueous commercially available sodium aluminate solution with an aqueous solution with an aqueous sodium hydroxide solution. The prepared sodium aluminate solution was maintained at a temperature of 15° C. 360 g of an aqueous sodium silicate solution containing 10% of $SiO_2$ and 3.25% of $Na_2O$ were prepared from an aqueous commercially available sodium silicate solution. The prepared sodium silicate solution was maintained at a temperature of 15° C. A gel was prepared from a mixture of the sodium aluminate solution and the sodium silicate solution in a manner similar to that mentioned in Example 6. The mixture of these two aqueous solutions had a $SiO_2/Al_2O_3$ ratio of 3 and a $Na_2O/Al_2O_3$ ratio of 5, both by mole. The obtained gel was filtered off and, then, washed with water. The gel cake, so obtained, was comprised of 3.4% of $Na_2O$, 5.5% of $Al_2O_3$, 8.9% of $SiO_2$ and 82.2% of $H_2O$.

A 0.5 liter volume glass vessel was charged with 170 g of an aqueous sodium silicate solution containing 28.6% of $SiO_2$ and 9.3% of $Na_2O$, and 37 g of an aqueous sodium hydroxide solution containing 8.1% of $Na_2O$. A portion (185 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.37, $SiO_2/Al_2O_3$ ratio of 11 and a $H_2O/Na_2O$ ratio of 40, all by mole. A zeolite crystal was formed from the slurry in a manner similar to that mentioned in Example 6, wherein crystallization was completed by maintaining the slurry at a temperature of 95° C. for 30 hours.

The zeolite crystal, so obtained, was proved to be a Y-type zeolite having a $SiO_2/Al_2O_3$ ratio of 4.6 by mole and a crystallization degree of 94%.

COMPARATIVE EXAMPLE 7

840 g of an aqueous sodium aluminate solution containing 2.4% of $Al_2O_3$ and 3% of $Na_2O$ were prepared by mixing an aqueous commercially available sodium aluminate solution with an aqueous sodium hydroxide solution. The prepared sodium aluminate solution was maintained at a temperature of 15° C. 360 g of an aqueous sodium silicate solution containing 10% of $SiO_2$ and 3.25% of $Na_2O$ were prepared from an aqueous commercially available sodium hydroxide solution. The prepared sodium silicate solution was maintained at a temperature of 15° C. A gel cake was prepared from a mixture of the sodium aluminate solution and the sodium silicate solution in a manner similar to that mentioned in Example 11. The mixture of the two aqueous solutions had a $SiO_2/Al_2O_3$ ratio of 3 and a $Na_2O/Al_2O_3$ ratio of 3, both by mole. The gel cake, so obtained, was comprised of 3.4% of $Na_2O$, 5.6% of $Al_2O_3$, 8.9% of $SiO_2$ and 82.1% of $H_2O$.

A 0.5 liter volume glass vessel was charged with 175 g of an aqueous sodium silicate solution containing 28.6% of $SiO_2$ and 9.3% of $Na_2O$, and 38 g of an aqueous sodium hydroxide solution containing 7.5% of $Na_2O$. A portion (176 g) of the above-mentioned gel cake was incorporated into the sodium silicate/sodium hydroxide mixed solution and the resultant mixture was stirred to obtain a uniform slurry. The slurry had a $Na_2O/SiO_2$ ratio of 0.37, a $SiO_2/Al_2O_3$ ratio of 11 and a $H_2O/Na_2O$ ratio of 40, all by mole, which numerical values were the same as those of the slurry obtained in Example 13. The slurry was treated in a manner similar to that mentioned in Example 6, but no Y-type zeolite could be obtained.

The molar ratio $SiO_2Al_2O_3$ in the gels formed in Examples 6 to 13 were calculated from the percent of $SiO_2$ and $Al_2O_3$ in the gels. These results are tabulated below:

| Example | $SiO_2/Al_2O_3$ Molar Ratio |
| --- | --- |
| 6 | about 3 |
| 7 | about 2.9 |
| 8 | about 2.9 |
| 9 | about 2.8 |
| 10 | about 2.9 |
| 11 | about 2.7 |
| 12 | about 2.9 |
| 13 | about 2.7 |

What is claimed is:

1. A process for producing a Y-type zeolite which consists essentially of the steps of:
   incorporating an aqueous alkali silicate solution with an aqueous alkali aluminate solution in the presence of an alkali in such an amount that the ratio of $M_2O$ (M: an alkali metal) to $Al_2O_3$, present in the resulting incorporated solution, is in the range of from about 7 to about 30 by mole and the ratio of $SiO_2$ to $Al_2O_3$, present in the resulting incorporated solution, is in the range of from 2 to 10 by mole, forming a gel having a $SiO_2/Al_2O_3$ molar ratio of from about 2.7 to about 3.0 in the incorporated solution, by maintaining the incorporated solution at a temperature of of from 40° C. to 70° C. for a period of at least 20 minutes, separating the gel from the mother liquor by filtration; and then,
   incorporating the separated gel in an aqueous solution of an alkali silicate or a mixture of an alkali silicate and an alkali to obtain a slurry having the following oxide molar ratios:
   $M_2O/SiO_2$: 0.25 to 0.50
   $SiO_2/Al_2O_3$: 6 to 20
   $H_2O/M_2O$: 20 to 80
   wherein M is an alkali metal, followed by forming Y-type zeolite crystals in the slurry.

2. A process according to claim 1, wherein the gel is formed by maintaining the incorporated solution at a temperature of from 50° to 70° C. for a period of at least 30 minutes.

3. A process according to claim 1, wherein the aqueous alkali silicate solution and the aqueous alkali aluminate solution, which are to be incorporated together in the presence of an alkali, contain, respectively, at least 2% by weight of $SiO_2$ and at least 2% by weight of $Al_2O_3$, based on the weight of the respective solutions.

4. A process according to claim 1, wherein the alkali silicate and the alkali aluminate are sodium silicate and sodium aluminate, respectively, and the alkali is sodium hydroxide.

5. A process according to claim 1, wherein the Y-type zeolite crystal is formed by maintaining the slurry at a temperature of from 80° to 110° C.

* * * * *